US008077610B1

(12) United States Patent  (10) Patent No.: US 8,077,610 B1
Arad et al.  (45) Date of Patent: Dec. 13, 2011

(54) MEMORY ARCHITECTURE FOR HIGH SPEED NETWORK DEVICES

(75) Inventors: Carmi Arad, Nofit (IL); Youval Nachum, RiShon LeZion (IL)

(73) Assignee: Marvell Israel (M.I.S.L) Ltd. (IL)

( * ) Notice: Subject to any disclaimer, the term of this patent is extended or adjusted under 35 U.S.C. 154(b) by 1027 days.

(21) Appl. No.: 11/453,349

(22) Filed: Jun. 12, 2006

Related U.S. Application Data

(60) Provisional application No. 60/775,943, filed on Feb. 22, 2006.

(51) Int. Cl.
*H04L 12/56* (2006.01)
(52) U.S. Cl. .......................................... 370/230; 370/413
(58) Field of Classification Search .................. 370/229, 370/395, 412, 419, 428, 463, 413, 423, 424, 370/230.1, 235, 389, 392, 395.3, 4, 395.42, 370/230; 707/10, E17.034; 711/1
See application file for complete search history.

(56) References Cited

U.S. PATENT DOCUMENTS

| | | | | |
|---|---|---|---|---|
| 5,487,133 A * | 1/1996 | Park et al. | ........................ | 706/20 |
| 6,081,522 A * | 6/2000 | Hendel et al. | ................. | 370/389 |
| 6,091,707 A * | 7/2000 | Egbert et al. | ..................... | 370/229 |
| 6,201,809 B1 * | 3/2001 | Lewin et al. | .................... | 370/392 |
| 6,219,728 B1 * | 4/2001 | Yin | ................................. | 710/52 |
| 6,424,621 B1 * | 7/2002 | Ramaswamy et al. | ........ | 370/230 |
| 6,501,761 B1 * | 12/2002 | Pannell et al. | ................. | 370/403 |
| 6,523,060 B1 * | 2/2003 | Kao | ............................ | 709/202 |
| 6,539,024 B1 * | 3/2003 | Janoska et al. | ................ | 370/412 |
| 6,618,390 B1 * | 9/2003 | Erimli et al. | ................... | 370/412 |
| 6,650,645 B2 * | 11/2003 | Scott et al. | ............... | 370/395.71 |
| 6,674,718 B1 * | 1/2004 | Heddes et al. | ................. | 370/230 |
| 6,714,989 B1 * | 3/2004 | Mizutani et al. | .............. | 709/250 |
| 6,717,912 B1 * | 4/2004 | Lemyre et al. | ................ | 370/230 |
| 6,885,664 B2 * | 4/2005 | Ofek et al. | ..................... | 370/372 |
| 6,920,106 B1 * | 7/2005 | Chou et al. | ..................... | 370/229 |
| 7,058,009 B1 * | 6/2006 | Skirmont et al. | ............ | 370/217 |
| 7,092,401 B2 * | 8/2006 | Craddock et al. | ............. | 370/412 |
| 7,110,405 B2 * | 9/2006 | Divivier | ......................... | 370/390 |
| 7,120,834 B1 * | 10/2006 | Bishara | ........................... | 714/43 |
| 7,126,959 B2 * | 10/2006 | Van Asten et al. | ............ | 370/429 |
| 7,248,596 B2 * | 7/2007 | Shimizu | ........................ | 370/413 |
| 7,284,076 B2 * | 10/2007 | Kishore et al. | .................. | 710/52 |
| 7,352,766 B2 * | 4/2008 | Van Asten et al. | ............ | 370/429 |
| 7,486,678 B1 * | 2/2009 | Devanagondi et al. | ....... | 370/394 |
| 7,649,882 B2 * | 1/2010 | Stiliadis | ........................ | 370/390 |
| 7,801,132 B2 * | 9/2010 | Ofek et al. | .................... | 370/389 |
| 7,948,976 B2 * | 5/2011 | Arad et al. | .................... | 370/389 |
| 2001/0001608 A1 * | 5/2001 | Parruck et al. | ................. | 370/232 |

(Continued)

OTHER PUBLICATIONS

Novel loop output buffer architecture and scheduling for efficient contention resolution in optical packet switching; Conference Date: Monday Sep. 8, 2003.*

(Continued)

*Primary Examiner* — Salman Ahmed

(57) ABSTRACT

An embodiment of the present invention reduces certain memory bandwidth requirements when sending a multicast message from a network device such as a router, bridge or switch. Separate output buffers are provided for different groups of egress ports, and incoming messages are written to some or all of the output buffers. A processing determination is made as to which egress ports will forward the message. Buffers associated with non-forwarding ports are released and the message is queued at the forwarding egress ports. When the message is forwarded, data is read from the output buffers associated with the forwarding egress ports.

28 Claims, 6 Drawing Sheets

U.S. PATENT DOCUMENTS

| | | | |
|---|---|---|---|
| 2001/0038607 A1* | 11/2001 | Honda | 370/218 |
| 2001/0038628 A1* | 11/2001 | Ofek et al. | 370/392 |
| 2002/0129189 A1* | 9/2002 | Lin et al. | 711/1 |
| 2002/0133619 A1* | 9/2002 | Lin et al. | 709/238 |
| 2003/0037163 A1* | 2/2003 | Kitada et al. | 709/236 |
| 2003/0053470 A1* | 3/2003 | Divivier | 370/412 |
| 2003/0189947 A1* | 10/2003 | Beshai | 370/428 |
| 2004/0008716 A1* | 1/2004 | Stiliadis | 370/429 |
| 2005/0013251 A1* | 1/2005 | Wang et al. | 370/235 |
| 2005/0018669 A1* | 1/2005 | Arndt et al. | 370/389 |
| 2005/0076035 A1* | 4/2005 | Lin et al. | 707/10 |
| 2005/0286537 A1* | 12/2005 | Shimada | 370/395.53 |
| 2006/0092837 A1* | 5/2006 | Kwan et al. | 370/229 |
| 2006/0187828 A1* | 8/2006 | Lee et al. | 370/229 |
| 2006/0187917 A1* | 8/2006 | Smith et al. | 370/389 |
| 2006/0203824 A1* | 9/2006 | Yu et al. | 370/395.32 |
| 2006/0209865 A1* | 9/2006 | Lee | 370/419 |
| 2007/0121499 A1* | 5/2007 | Pal et al. | 370/230 |
| 2007/0121630 A1* | 5/2007 | Stephen et al. | 370/390 |
| 2009/0010152 A1* | 1/2009 | Ofek et al. | 370/216 |
| 2010/0223435 A1* | 9/2010 | Jones | 711/154 |

OTHER PUBLICATIONS

Divisible load scheduling on single-level tree networks with buffer constraints; X Li, V Bharadwaj—Aerospace and Electronic Systems 2000.*

A Load-based Queue Scheduling Algorithm for MANET; Z Chen, Z Ge—Journal of Communication and Computer, 2006.*

Packet-scheduling algorithm based on priority of separate buffers for unicast and multicast services; SH Lee—Electronics Letters, 2003.*

* cited by examiner

MEMORY ARCHITECTURE FOR HIGH SPEED NETWORK DEVICES

CROSS-REFERENCES TO RELATED APPLICATIONS

The present application claims benefit under 35 USC 119 (e) of U.S. provisional Application No. 60/775,943, filed Feb. 22, 2006, entitled "Memory Architecture For High Speed Network Devices", the content of which is incorporated herein by reference in its entirety.

FIELD OF THE INVENTION

The present invention relates to data networks in general and, in particular, to the memory architecture of a network device.

BACKGROUND OF THE INVENTION

With the proliferation of data networks, the demands on network devices which receive and transmit data traffic are evolving. In many such networks, these devices (e.g., switches or routers) are being called on to switch a rapidly increasing amount of traffic. Moreover, as transmission speeds increase, network devices must switch the data traffic at a faster rate to keep up with the inflow. One factor driving these changes is the increase in multicast traffic. Multicast messages are commonly used for one-to-many delivery of data.

When a network device receives a data packet, it typically stores the packet temporarily in the device Random Access Memory (RAM) while a determination is made regarding the forwarding decision. Network devices often have a large number of egress ports, and multicast data packets received by a device may be directed to a significant subset of those ports. Thus, in many circumstances, multicast packets are read more than once from a single bank of memory as the packet is copied for each port through which it is forwarded. As the number of ports on a network device increases, memory bandwidth requirements also increase and may eventually exceed the bandwidth available from a single memory device. Therefore, there is a need in the art for a network device with a memory architecture that scales with increasing demand for bandwidth.

BRIEF SUMMARY OF THE INVENTION

An embodiment of the present invention reduces certain memory bandwidth requirements when sending a multicast message from a network device such as a router, bridge or switch. Separate output buffers are provided for different groups of egress ports and incoming messages are written to some or all of the output buffers. A processing determination is made as to which egress ports will forward the message. Buffers associated with non-forwarding ports are released and the message is queued at the forwarding egress ports. When the message is forwarded, data is read from the output buffers associated with the forwarding egress ports. Thus, each output buffer is only required to provide bandwidth in connection with forwarding messages through its associated egress ports. This represents a reduction in total memory bandwidth requirements compared to a single-buffer implementation. Moreover, this reduction in memory bandwidth may increase as the number of buffers serving a fixed number of egress ports increases.

In certain embodiments, a method of forwarding a data packet using different sets of buffers of a network device is described. A data packet is written to a first set of buffers coupled with a first set of egress ports for the device. The data packet is also written to a second set of buffers coupled with a second set of egress ports for the device. The first set of buffers is released based on a determination that the data packet is not to be forwarded through the first set of egress ports. The data packet is then forwarded from the second set of buffers through a subset of the second set of egress ports.

In some embodiments, the data packet comprises payload encapsulated in a Media Access Control (MAC) frame. The data packet is scheduled for forwarding through the subset of the second set of egress ports. To accomplish this, a descriptor of the data packet written to the second set of buffers is queued after the first set of buffers is released. These buffers may be released by identifying the buffers as available.

In various embodiments, a forwarding database is accessed to determine that the data packet is not to be forwarded through the first set of egress ports, and to determine one or more ports of the second set of egress ports through which the data packet is to be forwarded. The data packet is read from the second set of buffers and forwarded. The second set of egress ports are not configured to receive data read from the first set of buffers, and the first set of egress ports are not configured to receive data read from the second set of buffers.

In a number of embodiments, the first set of buffers may be located in a first memory bank, and the second set of buffers may be located in a second memory bank. The first memory bank and the second memory bank may be made up of a selection from the group consisting of static RAM (SRAM), dynamic RAM (DRAM), flash memory, system cache, other media capable of storing data, and any combination thereof. The first memory bank and the second memory bank may each comprise one or more memory modules.

In a variety of embodiments, an apparatus is described which is configured to perform the methods described above. The apparatus comprises a number of egress ports, a first set of buffers coupled with a first subset of the egress ports, and a second set of buffers coupled with a second subset of egress ports. The apparatus also includes a receive unit, a memory access unit, a transmit queue unit, and a transmit unit. In some embodiments, each set of buffers is located in different memory banks. The apparatus may, for example, be a bridge, a switch, a router, or any combination thereof.

According to other embodiments of the invention, an apparatus configured with means to forward a data packet using different sets of buffers of a network device is described. The apparatus includes means to write the data packet to a first set of buffers coupled with a first set of egress ports for the device. The apparatus further includes means to write the data packet to a second set of buffers coupled with a second set of egress ports for the device. The apparatus includes means to release the buffers based on a determination that the data packet is not to be forwarded through the first set of egress ports. The apparatus includes means to forward the packet from the second set of buffers through a subset of the second set of egress ports.

In one embodiment, the apparatus includes means to schedule the data packet for forwarding through the subset of the second set of egress ports. To accomplish this, the apparatus includes means for queuing a descriptor of the data packet. The descriptor may be placed in a means for identifying the sequence that data packets are to be transmitted through the port. The apparatus includes means for identifying the buffers as available.

In some embodiments, the apparatus includes means for accessing a forwarding database to determine that the data packet is not to be forwarded through the first set of egress ports, and means to determine one or more ports of the second set of egress ports through which the data packet is to be forwarded. The apparatus includes means to read the data packet from the second set of buffers. The set of buffers may comprise any means of storing information on a temporary or more permanent basis. Moreover, the egress ports may comprise any exit means for a network device.

According to other embodiments of the invention, code is provided to forward a data packet using different sets of buffers of a network device. In such embodiments, there is code to write the data packet to a first set of buffers coupled with a first set of egress ports for the device, and code to write the data packet to a second set of buffers coupled with a second set of egress ports for the device. There is code to release the buffers based on a determination that the data packet is not to be forwarded through the first set of egress ports. There is also code to forward the packet from the second set of buffers through a subset of the second set of egress ports.

In one embodiment, there is code to schedule the data packet for forwarding through the subset of the second set of egress ports. There is code for queuing a descriptor of the data packet written to the second set of buffers after the first set of buffers is released. There is code for placing the descriptor in a transmit queue for identifying the sequence that data packets are to be transmitted through the port. There is also code for identifying the first set of buffers as available.

In some embodiments, there is code for accessing a forwarding database to determine that the data packet is not to be forwarded through the first set of egress ports, and code to determine one or more ports of the second set of egress ports through which the data packet is to be forwarded. In such instances, there is code to read the data packet from the second set of buffers.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following systems, methods, and software may be components of a larger system, wherein other procedures may take precedence over or otherwise modify their application. Also, a number of steps may be required before, after, or concurrently with the following embodiments.

I. Overview

The invention comprises a novel memory architecture for a network device and methods for its use. According to various embodiments of the invention, a method of forwarding a data packet using different sets of buffers of a network device is described. A data packet is written to a first set of buffers coupled with a first set of egress ports for the device. The data packet is also written to a second set of buffers coupled with a second set of egress ports for the device. The first set of buffers is released based on a processing determination that the data packet is not to be forwarded through the first set of egress ports. The data packet is then scheduled to be forwarded through one or more of the second set of egress ports. Because the processing delay is short compared to the queuing delay, buffers associated with the non-forwarding ports are released quickly and can be used for other purposes. Thus, buffers in the first set are occupied only for a relatively short time before they are released and become available to store other data packets. However, the second set of buffers store the data packet until forwarding is complete. In some embodiments, an apparatus is described which is configured to perform the methods described above.

II. Exemplary High Level Memory Architecture

Figure 1:
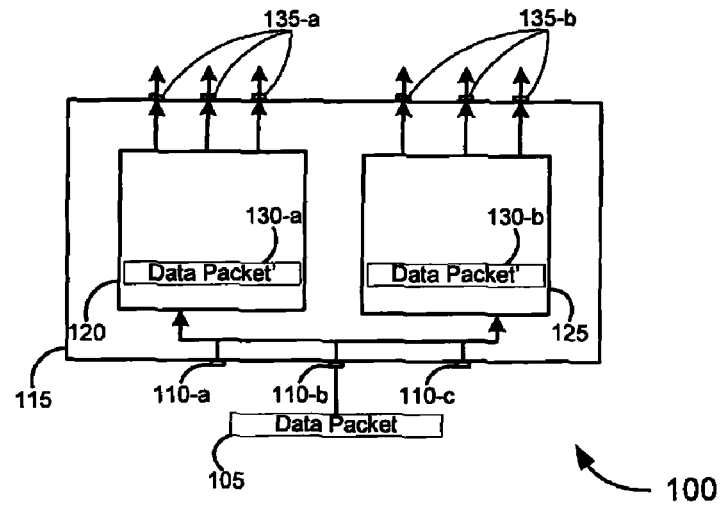
FIG. 1 is a simplified high-level block diagram illustrating a memory architecture for a network device according to various embodiments of the present invention.

FIG. 1 is a high level block diagram of a device configuration 100 which illustrates various exemplary embodiments of the invention. A data packet 105 is received through an ingress port 110-b of a network device 115. A data packet 105, as that term is used herein, may comprise any grouping of data. For example, the data packet 105 may comprise a unicast or multicast data packet. Also, a data packet 105 may simply be the payload of a received packet. In some embodiments, a data packet 105 is Media Access Control (MAC) frame, or the payload encapsulated therein. The data packet 105 may, however, comprise any other layer 2 or 3 data packet, or the payload encapsulated therein. The network device may be a bridge, switch, router, or combination thereof, or may be any device on a network which sends or forwards data packets.

The device includes two memory areas, as illustrated by reference numerals 120 and 125. In some embodiments, memory 120 is a first memory bank, and memory 125 is a second memory bank. The first memory bank and the second memory bank may be made up a selection from the group consisting of Static RAM (SRAM), Dynamic RAM (DRAM), flash memory, system cache, other media capable of storing data, and any combination thereof. By way of example, DRAM may include Error Correcting Code (ECC), Extended Data Output (EDO), Synchronous DRAM (SDRAM), Double Data Rate (DDR) SDRAM, RDRAM, RLDRAM, FCRAM, and any other variations. The first memory bank and the second memory bank may comprise one or more memory modules (e.g., SIMMs, DIMMs, RIMMs etc.).

Upon being received at the device 115, the data packet 105 is written to separate sets of buffers, namely a first set of buffers 130-a in memory 120, and a second set of buffers 130-b in memory 125. Therefore, a first copy of the data packet is stored in the first set of buffers 130-a, and a second copy of the data packet is stored in the second set of buffers 130-b. Buffers, as that term is used herein, are parts of memory used for temporary storage of data while a network device determines how a data packet is to be forwarded. A set of buffers may also comprise any part of memory that is used to store data while a network device is making or otherwise receiving forwarding determinations for the data. However, for simplicity, both memories 120, 125 often have a same size and x-y ratio. Both sets of buffers 130-a, 130-b are also generally the same size.

In this set of embodiments, memory 120 is coupled with a first set of egress ports 135-a for the device 115, but not coupled with the second set of egress ports 135-b. Similarly, memory 125 is coupled with a second set of egress ports 135-b for the device 115, but not coupled with the first set of egress ports 135-a. The device 115 then determines that the data packet 105 is not to be forwarded to any of the first set of egress ports 135-a. The first set of buffers 130-a are released based on this determination. While in these embodiments this determination is made by the device 115 itself, in other embodiments it is made elsewhere and received by the device. There are a variety of ways such a determination may be made. For example, in the case of a unicast packet, if the device 115 determines that a data packet is to be forwarded through one of the second set of egress ports 135-b, the first set of buffers may be released upon that determination. In some embodiments, the device (or the processing pipeline contained therein) is configured to make a decision in the processing pipeline about the egress ports 135 through which the data packet 105 is to be forwarded. Thus, buffers not involved in forwarding the data packet are occupied only while the packet is being processed and are released before the packet is queued.

In one exemplary embodiment, a MAC frame is received and parsed to extract header information. The header information then proceeds through any number of ingress engines in a processing pipeline, where a determination is made that the packet is not to be forwarded through the first set of egress ports 135-a (such ingress engines will be discussed in detail below). Upon determining that the MAC frame is not to be forwarded through the first set of egress ports 135-a, the first set of buffers 130-a are released. For example, a buffer release engine in the processing pipeline may signal to a buffer allocation mechanism that the first set of buffers 130-a can be deallocated and made available for other uses. The buffer allocation mechanism may comprise any device, method or means known in the art which indicates the availability of the first set of buffers 130-a.

After the first set of buffers is released, the data packet (or one or more descriptors thereof) may be queued for transmission. The queue may be on a per port basis, or may be a queue for more than one port. As is known in the art, other priority or preference factors (e.g., QoS factors) attributed to the packets to be forwarded may modify the queuing sequence. The data packet is then read from the second set of buffers 130-b, and forwarded through the second set of egress ports 135-b (or a subset thereof).

Figure 2:
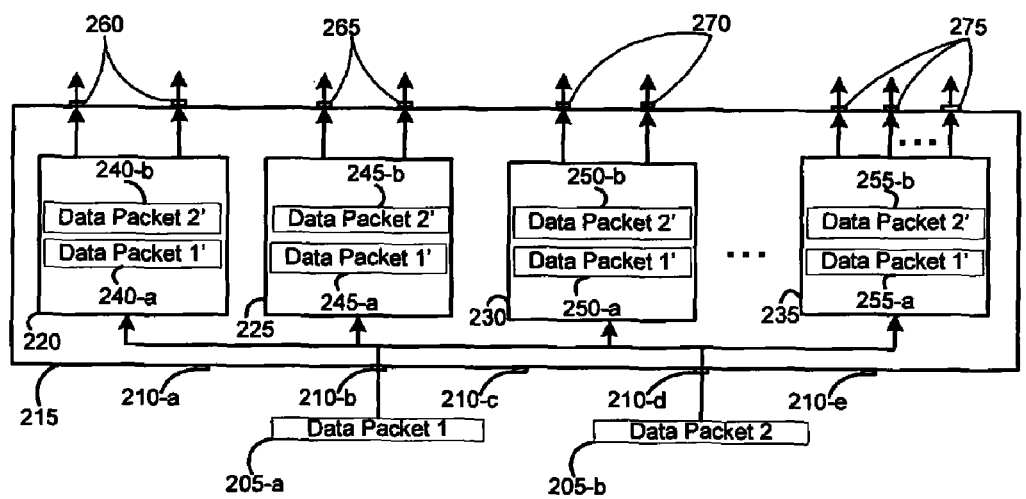
FIG. 2 is a simplified high-level block diagram illustrating a memory architecture with multiple ingress ports and memory banks, according to various embodiments of the present invention.

Turning to FIG. 2, a simplified block diagram illustrating alternative exemplary embodiments of device configuration 200 is shown. A first data packet 205-b (i.e., Data Packet 1) is received through a first ingress port 210-a of a network device 215. In these embodiments, the device includes four memory elements, as illustrated by reference numerals 220, 225, 230 and 235. Each memory element may comprise any of the configurations or media described above. The first data packet is written to different sets of buffers in each of the four memory elements. The first data packet is, thus, written to a set of buffers 240-a in memory element 220, written to a set of buffers 245-a in memory element 225, written to a set of buffers 250-a in memory element 230, and written to a set of buffers 255-a in memory element 235. A second data packet 205-d (i.e., Data Packet 2) is received through a second ingress port 210-b of the device 215. The second data packet is also written to different sets of buffers in the respective four memory elements. The second data packet 205-b is thus written to a set of buffers 240-b in memory element 220, written to a set of buffers 245-b in memory element 225, written to a set of buffers 250-b in memory element 230, and written to a set of buffers 255-b in memory element 235.

It is worth noting that in other embodiments, there may be additional ingress ports, each writing data packets to the memory elements (220, 225, 230, 235) as they are received. Moreover, in other embodiments, there may be more (or fewer) memory elements. For simplicity, a single ingress port and two memory elements may be discussed. However, this should not be considered a limitation, as such devices may be configured with different numbers of ingress ports and memory elements.

Returning to the present set of embodiments, memory 220 is coupled with a first set of egress ports 260 for the device 215, but not coupled with any other egress ports (265, 270, 275). Memory 225 is coupled with a second set of egress ports 265 for the device 215, but not coupled with any other egress ports (260, 270, 275). Memory 230 is similarly coupled with only egress ports 270, and memory 235 is similarly coupled with only egress ports 275. Although in some cases only two egress ports are illustrated in some sets of egress ports, it should be recognized that there may be any number of egress ports in a set, as shown in set 275. In other embodiments of the invention, it should be noted that certain sets of egress ports may be coupled with more than one memory bank. This may be the case, for example, for certain high traffic sets of ports on a device.

The device 215 then determines (perhaps by parsing the header and accessing a forwarding database) that the data packet 205-*a* is a unicast packet to be forwarded through a selected port of the set of egress ports 260. Upon making this determination, the sets of buffers 245-*a*, 250-*a*, and 255-*a* are released. The buffers may be released in any manner known in the art. Data is then read from buffer 240-*a*, and forwarded through the selected port of the set of egress ports 260. The device 115 also determines that data packet 205-*b* is a multicast packet to be forwarded only through a selected port of the set of egress ports 265 and forwarded (flooded) to all ports of the set of ports 275. Upon making this determination, the sets of buffers 240-*b* and 250-*b* are released. Data is then read from buffer 245-*b*, and forwarded through the selected port of the set of egress ports 265. For each port of the set of ports 275, the data is read from 255-*b* and forwarded to each port of set 275 (i.e., it is read once for each port). This reading and forwarding may occur in any manner described herein, or in any other manner known in the art.

III. Exemplary Device Architecture

Figure 3:
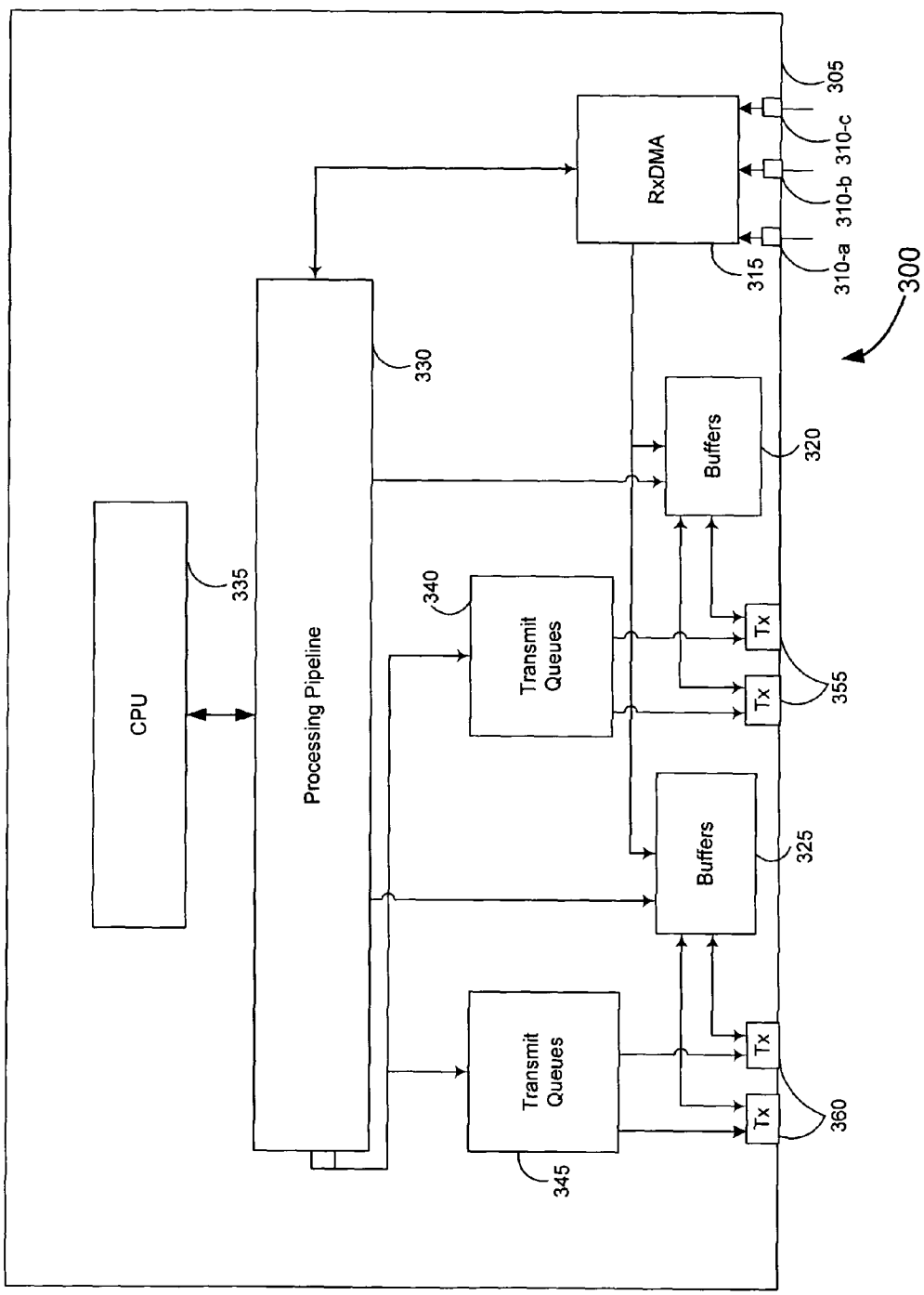
FIG. 3 is a simplified high-level block diagram illustrating a network device memory architecture with different sets of buffers for different egress ports, according to various embodiments of the present invention.

FIG. 3 represents a block diagram illustrating an exemplary device configuration 300 according to various embodiments of the invention. The network device 305 may be a bridge, switch, router, or combination thereof, or may be any other device on a network which sends or forwards data packets. The device 305 may comprise one, or more, integrated circuits configured to execute instructions to perform the methods of the invention. A data packet is received through an ingress port 310-*b* of the device 305. Upon reception, the RxDMA system 315 (Direct Memory Access) writes the data packet (which may simply comprise the payload of a received packed packet) to a first set of buffers 320, and also writes the data packet to a second set of buffers 325. In other embodiments, some other controller or device known in the art may be used to transfer and write the data packet to the first 320 and second 325 sets of buffers. The first set of buffers 320 is coupled with a first set of egress ports 355 (and not communicatively coupled with any other set of egress ports). Also, the second set of buffers 325 is coupled with a second set of egress ports 360 (and not communicatively coupled with any other set of egress ports). The first and second sets of buffers 320, 325 may be located in the memory region of an integrated circuit comprising the device, or the memory may be off the integrated circuit.

A received data packet is then processed by the processing pipeline 330. The processing pipeline 330 may be embodied on an Application Specific Integrated Circuit (ASIC), or a general purpose processor adapted to perform the applicable functions. Alternatively, the functions of the processing pipeline may be performed by one or more other processing units (or cores), on one or more integrated circuits. A CPU 335 is depicted, which controls certain aspects of the processing pipeline, as well. In some embodiments, the data packet is parsed and header information is processed by pipeline 330.

Depending on the data packet received, the processing pipeline may parse one or more of the following packet header fields: VLAN-ID, MAC Source Address, MAC Destination Address, Source IP Address, Destination IP Address, or other addressing information. The addressing information parsed from the header is used to lookup the ports through which the data packet should be forwarded. The pipeline accesses a forwarding database, or otherwise determines in any manner known in the art, the specific ports 355, 360 on the device 305 through which the data packet is to be forwarded. For example, the forwarding decisions may be made before functions such as VLAN assignment, MAC learning, address table entries aging, IGMP and MLD snooping, forwarding database building, or packet trapping and mirroring are undertaken.

Once a determination is made that a data packet is not to be forwarded through a given set of egress ports, the set of buffers which is coupled with that set of ports is released (i.e., the processing pipeline is configured to cause a buffer allocation mechanism to release the buffers at issue). Generally speaking, the delay associated with pipeline processing is deterministic and short relative to the delay associated with forwarding the packet. Thus, by freeing unnecessary buffers immediately upon completion of pipeline processing, resources are returned to the device as quickly as possible.

Next, the processing pipeline 330 examines the decisions made, and prepares the packet descriptor applicable to the ports through which the data packet will be forwarded. The descriptor includes an identification of the port (or ports) through which a packet is to be forwarded, along with additional information about the data packet. The descriptor also includes a buffer address, or other pointer, to the location in the buffer where the data is written. The pipeline 330 replicates the descriptor of a multicast packet for each egress port member of the multicast group. In other embodiments, the processing pipeline creates a descriptor specifically for each egress port member of the group.

If a data packet is to be forwarded, the descriptor is placed in a transmit queue 340, 345 for the set of egress ports through which the data packet will be forwarded. Before the descriptor is queued, any buffers not associated with the forwarding egress ports are released. In some embodiments, a set of buffers is released by communicating to a buffer allocation mechanism that the set of buffers should be deallocated and used for other purposes. The buffer allocation mechanism may comprise any device, method or means known in the art which indicates the availability of the set of buffers. The egress port 355, 360 (using a mechanism such as a TxDMA coupled thereto) reads data from its associated buffers 320, 325, and forwards the data packet according to the descriptor. In different embodiments of the invention, different components perform the above functions. Moreover, these functions may be performed in a different order, and one or more steps may be added, dropped, or otherwise modified.

A further understanding of these embodiments of the invention may be gained by looking at an exemplary multicast packet and how it is processed by the device depicted in FIG. 3. Upon receipt, the multicast packet is written to both sets of buffers, and proceeds to the processing pipeline 330. The processing pipeline then determines that the multicast packet is to be forwarded through a selected egress port of the first set 355, and a selected egress port of the second set 360. A first descriptor of the multicast packet is placed in a transmit queue 340 for the selected egress port of the first set 355, and a second descriptor is placed in a transmit queue 345 for the selected egress port of the first set 360.

By using multiple buffers 320, 325 in the manner described, the bandwidth requirements for each buffer are reduced compared to a single-buffer solution. As shown, each buffer 320, 325 supports one-half of the egress ports 355, 360 of the network device. Data is read from the buffers separately when packets are forwarded through their associated egress ports. Therefore, the bandwidth required to read data from each buffer 320, 325 is only one-half the bandwidth required to read the same amount of data from a single-buffer. Although the same bandwidth is required to write packets to multiple buffers, total bandwidth per-buffer decreases relative to a single-buffer solution as the number of buffers increases. In the limit, total memory bandwidth per-buffer approaches 50% of the single-buffer bandwidth required to support a same number of egress ports.

This reduction in memory bandwidth is illustrated as follows. A particular network device might include a total of 10 egress ports with each port supporting a data rate of 1 Gbps. In a single-buffer solution, the network device might service the 10 egress ports by writing data at a rate of 10 Gbps to the buffer and reading data at a rate of 10 Gbps from the buffer. The single buffer may therefore be required to provide total (read+write) bandwidth of 20 Gbps. By contrast, a two buffer system according to the present invention requires 25% less bandwidth per-buffer to achieve the same result. More specifically, each buffer is still required to provide the 10 Gbps write bandwidth. However, if each buffer is configured to support five egress ports, then each buffer may be required to provide only 5 Gbps read bandwidth. Thus, per-buffer bandwidth may be lowered to 15 Gbps, a 25% reduction compared to the bandwidth required in the single-buffer implementation. It will be clear that this bandwidth savings increases with the number of buffers servicing the same number of egress ports.

Figure 4:
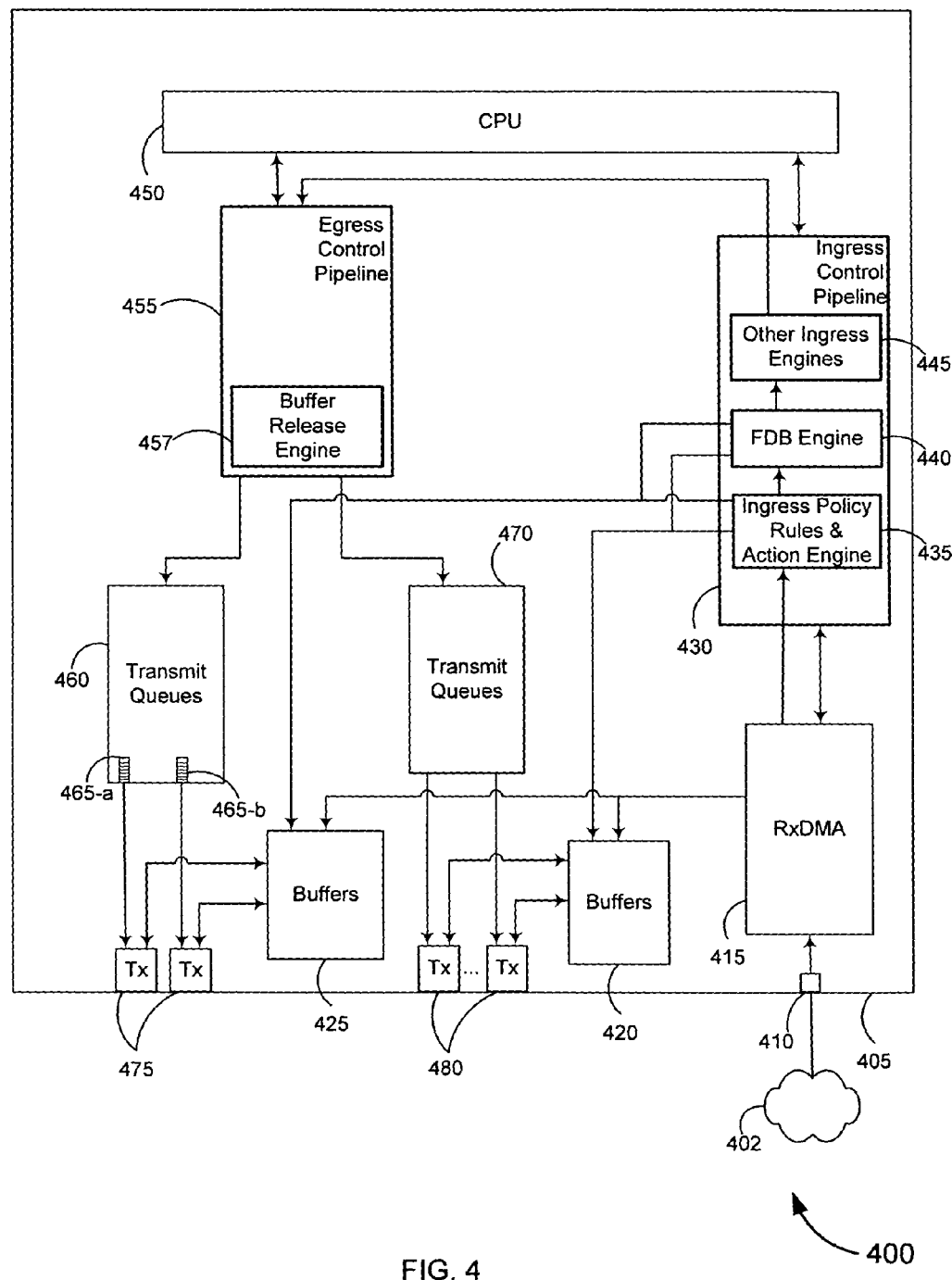
FIG. 4 is a simplified high-level block diagram illustrating an alternative network device memory architecture with different sets of buffers for different egress ports, according to various embodiments of the present invention.

FIG. 4 represents a block diagram illustrating an alternative exemplary device configuration 400 according to various embodiments of the invention. Again, the network device 405 may be a bridge, switch, router, or combination thereof, or may be any other device on a network which sends or forwards data packets. The device 405 may comprise one, or more, integrated circuits configured to execute instructions to perform the methods of the invention. A data packet is received from a network 402 through an ingress port 410 of the device 405. Upon reception, the RxDMA system 415 (Direct Memory Access) writes the data packet to a first set of buffers 420, and also writes the data packet to a second set of buffers 425, in any manner known in the art. The first set of buffers 420 is coupled with a first set of egress ports 480 (and not coupled with any other set of egress ports). Also, the second set of buffers 425 is coupled with a second set of egress ports 475 (and not coupled with any other set of egress ports). As illustrated at the first set of egress ports 480, there may be any number of egress ports in a set.

A received data packet is then processed by an Ingress Control Pipeline 430. The ingress control pipe 430 is embodied on an Application Specific Integrated Circuit (ASIC), and comprises a number of engines configured to perform processing tasks. (In other embodiments, a general purpose processor may be adapted to perform the applicable functions. Alternatively, the functions of the processing pipeline may be performed by one or more other processing units or cores, on one or more integrated circuits.) In the Ingress Control Pipe 430, an Ingress Policy Rules and Action Engine 435 comprises a number of sub-engines. The Ingress Policy Rules and Action Engine 435 may decode the packet header and extract data (e.g., VLAN-ID, MAC Source Address, MAC Destination Address, Source IP Address, Destination IP Address, or other addressing information) to be used by the subsequent engines. The Ingress Policy Rules and Action Engine 435 also applies access and policy control lists (including tunneling rules)

The addressing information parsed from the header (or a subset thereof) is then used by an Forwarding Database Engine 440 ("FDB Engine") to lookup and determine the specific ports 475, 480 on the device 405 through which the data packet is to be forwarded. The FDB Engine 440 accesses a forwarding database to make the determination. The forwarding database may be located on the integrated circuit comprising the FDB Engine, located in another location on the device, or located elsewhere as is known in the art. The FDB Engine 440 may be applied before the Other Ingress Engines 445, which may variously perform functions such as VLAN assignment, MAC learning, address table entries aging, IGMP and MLD snooping, forwarding database building, and packet trapping and mirroring. (Note that in other embodiments, the FDB Engine 440 is placed in other locations in the Ingress Control Pipe 430.)

If a determination is made by the FDB Engine 440 that a data packet is not to be forwarded through a given set of egress ports, the set of buffers which is coupled with that set of ports is released. In this case, a buffer release engine 457 shown as part of Egress Control Pipeline 455 causes the buffers not involved with forwarding the data packet to be freed. A packet descriptor applicable to the ports through which the data packet will be forwarded is then created. The descriptor includes an identification of the port or ports through which a packet is to be forwarded, and the buffer address, along with additional information about the data packet. Note that a CPU 450 is depicted which controls certain aspects of the Ingress Control Pipeline 430 and Egress Control Pipeline 455.

If a data packet is to be forwarded, the descriptor is placed in a transmit queue 460, 470 for the set of egress ports through which the data packet will be forwarded. An engine in the Egress Control Pipe 455 replicates the descriptor of a multicast packet for each egress port member of the multicast group. The transmit queue 460 is configured to provide queuing on a per port 465 basis. Before the descriptor is queued, each set of buffers not configured to serve the set of forwarding egress ports is released. The applicable egress ports 475, 480 (using a mechanism such as a TxDMA coupled thereto) read the set of buffers 420, 425 serving the applicable egress port(s), and forward the data packet according to information in the descriptor. The data is read from the applicable buffer for each port through which the data packet is to be forwarded (thus, it may be read multiple times from the buffer). As noted above, in different embodiments of the invention, different components perform the above functions. Moreover, these functions may be performed in a different order, and one or more steps may be added, dropped, or otherwise modified.

IV. Alternative Exemplary Embodiments

Figure 5:
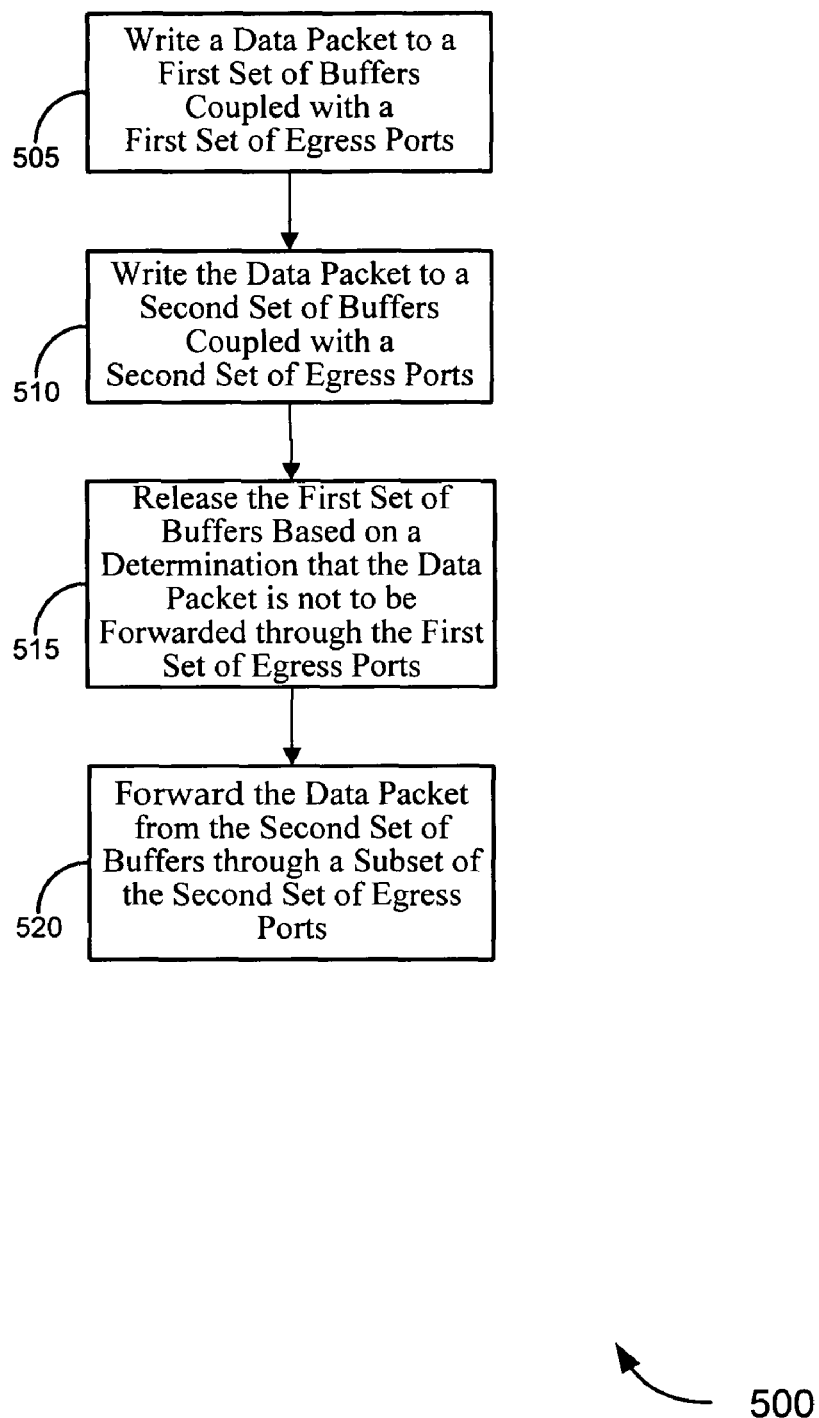
FIG. 5 is a flowchart illustrating a method of using a memory architecture for a network device according to various embodiments of the present invention.

FIG. 5 sets forth a flow chart 500 illustrating an exemplary embodiment of the invention. At block 505, a data packet is written to a first set of buffers coupled with a first set of egress ports. At block 510, the data packet is written to a second, different set of buffers coupled with a second set of egress ports. At block 515, the first set of buffers is released, based on a determination that the data packet is not to be forwarded through the first set of egress ports. At block 520, the data packet is forwarded from the second set of buffers through a subset of the second set of egress ports.

Figure 6:
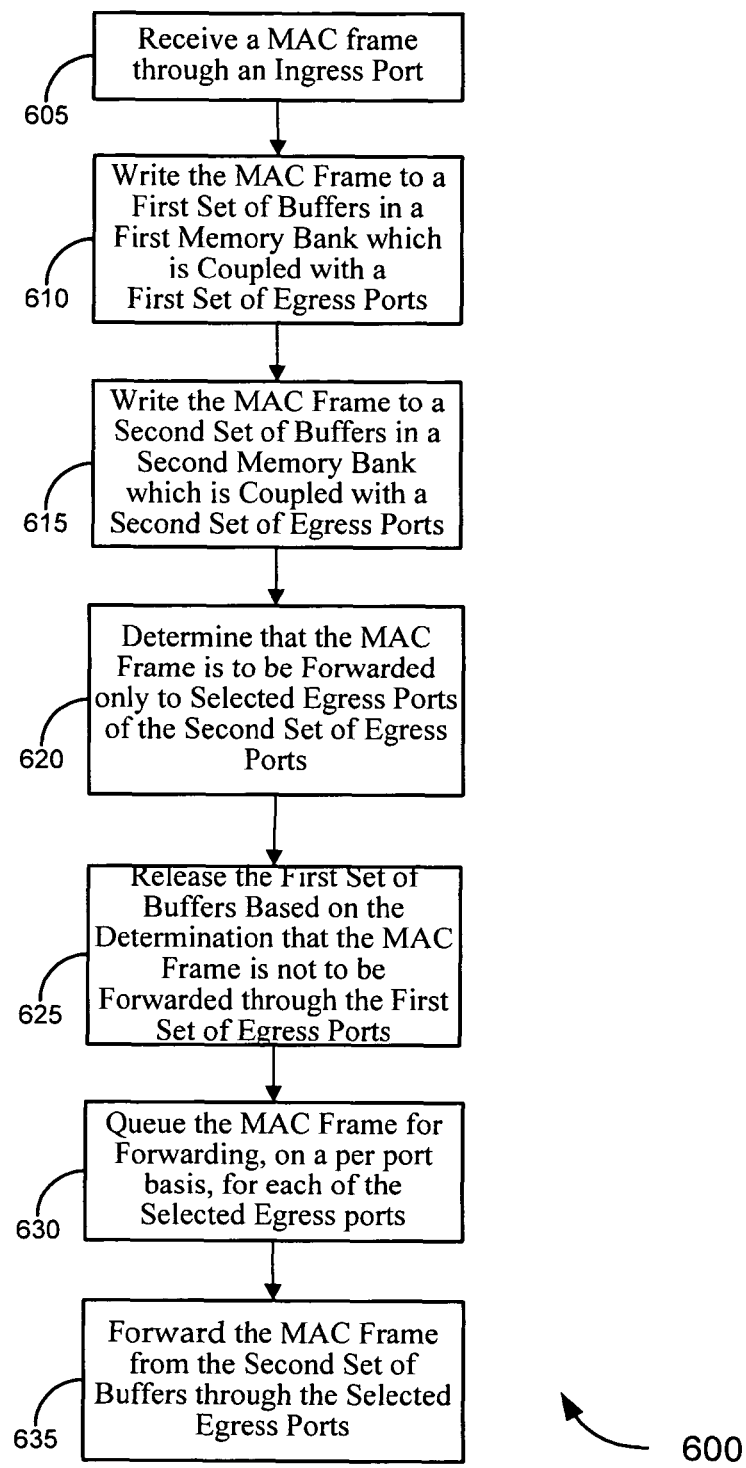
FIG. 6 is a flowchart illustrating an alternative method of utilizing a memory architecture for a network device according to various embodiments of the present invention.

FIG. 6 sets forth a flow chart 600 illustrating an alternative exemplary embodiment of the invention. At block 605, a MAC frame is received through an ingress port of a network device. At block 610, the MAC frame is written to a first set of buffers in a first memory bank which is coupled with a first set of egress ports. At block 615, the MAC frame is written to a second set of buffers in a second memory bank which is coupled with a second set of egress ports. At block 620, it is determined that the MAC frame is to be forwarded only to selected egress ports among the second set of egress ports. The first set of buffers is then released, at block 625, based on the determination that the MAC frame is not to be forwarded through the first set of egress ports. At block 630, the MAC frame is queued for forwarding, on a per port basis, for each of the selected egress ports. The queuing may be performed in any manner known in the art. At block 635, the MAC frame is forwarded from the second set of buffers through the selected egress ports among the second set of egress ports.

Figure 7:
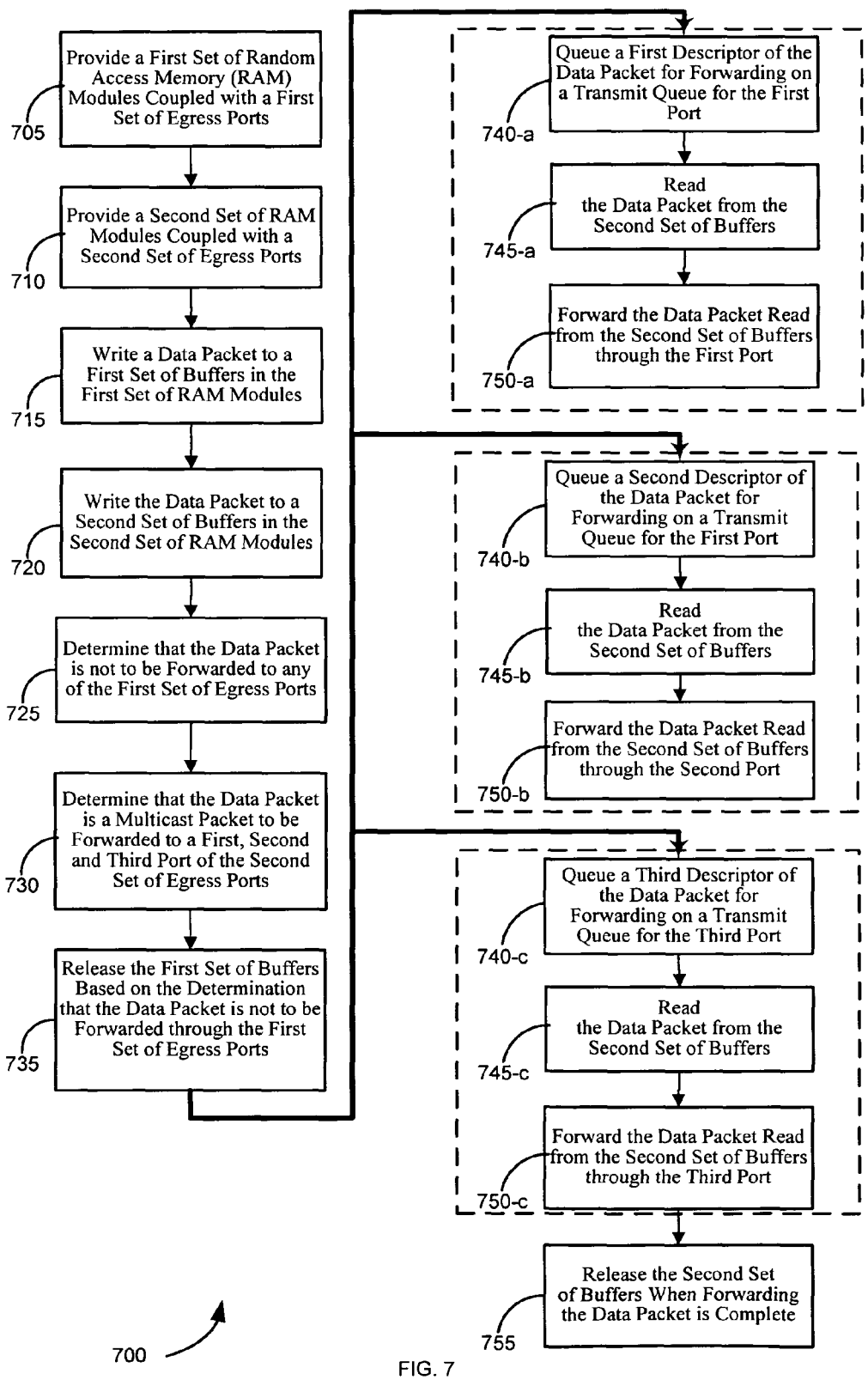
FIG. 7 is a flow diagram illustrating a method of using a memory architecture with per port transmit queues according to various embodiments of the present invention.

FIG. 7 sets forth a flow chart 700 illustrating a final exemplary embodiment of the invention. At block 705, a first set of RAM modules coupled with a first set of egress ports on a network device are provided. At block 710, a second set of RAM modules is provided, the second set coupled with a second set of egress ports. At block 715, a data packet is written to a first set of buffers in the first set of RAM modules, and at block 720 the data packet is written to a second set of buffers in the second set of RAM modules. At block 725, it is determined that the data packet is not to be forwarded to any of the first set of egress ports. At block 730, it is determined that the data packet is a multicast packet to be forwarded to a first, second and third port of the second set of egress ports.

At block 735, the first set of buffers is released based on the determination that the data packet is not to be forwarded through the first set of egress ports. At block 740-a, a first descriptor of the data packet is queued for forwarding on a transmit queue for the first port. At block 745-a, the data packet is read from the second set of buffers. At block 750-a, the data packet read from the second set of buffers is forwarded through the first port. At block 740-b, a second descriptor of the data packet is queued for forwarding on a transmit queue for the second port. At block 745-b, the data packet is again read from the second set of buffers. At block 750-b, the data packet read (for a second time) from the second set of buffers is forwarded through the second port. At block 740-c, a third descriptor of the data packet is queued for forwarding on a transmit queue for the third port. At block 745-c, the data packet is yet again read from the second set of buffers. At block 750-c, the data packet read (for a third time) from the second set of buffers is forwarded through the third port. At block 755, all descriptors have been de-queued and the second set of buffers is released. It is worth noting that while in some embodiments a data packet is scheduled for forwarding by placing its descriptor in a transmit queue, there are a variety of ways known in the art to forward a data packet which may be used.

CONCLUSION

It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow chart, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable media such as a storage medium. Such machine readable media may include read only memory (ROM), random access memory (RAM), magnetic RAM, core memory, magnetic disk storage mediums, optical storage mediums, flash memory devices or other machine readable mediums for storing information. The media may be located in a device including, but is not limited to, portable or fixed storage devices, storage media, optical storage devices, a sim card, other smart cards, and various other mediums capable of storing, containing or carrying instructions or data. One or more processors or processor cores may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. In addition, reference is made to different functions performed by different units or engines, such as receive unit, a memory access unit, a forwarding database engine, a transmit queue unit, and a transmit unit. These functions could be performed anywhere in processing pipeline 330 of FIG. 3, or in any other location on one or more chips comprising the device. Alternatively, the functions could be performed in any other separate processing units (on one or more integrated circuits), or some or all could be performed in a single processing unit differently configured (e.g., by program instructions) for each function.

Also, a number of steps may be required before the above elements are considered. For example, a preprocessing engine (or other ingress policy engine) may be configured to identify all received multicast packets at a network device, and only write the multicast packets to the different sets of buffers for each of the sets of egress ports. Unicast packets could be written to a set of buffers serving all ports. Also, data packets may be written to other memories in addition to the memory regions specified (e.g. main memory). Accordingly, the above description should not be taken as limiting the scope of the invention, which is defined in the following claims.

What is claimed is:

1. A method of forwarding a data packet using different sets of buffers of a network device, the method comprising:
writing the data packet to a first set of buffers coupled with a first set of egress ports for the network device before determining whether to forward the data packet through the first set of egress ports based on accessing at least one forwarding database;
writing the data packet to a second set of buffers coupled with a second set of egress ports for the network device before determining whether to forward the data packet through the second set of egress ports based on accessing the at least one forwarding database;

determining whether to forward the data packet through the first set of egress ports or the second set of egress ports based on accessing the at least one forwarding database;

releasing the first set of buffers if it is determined that the data packet is to be forwarded through the second set of egress ports and not to be forwarded through the first set of egress ports; and forwarding the data packet from the second set of buffers through a subset of the second set of egress ports if it is determined that the data packet is to be forwarded through the second set of egress ports.

2. The method of claim 1, further comprising:
queuing the data packet for forwarding through the subset of the second set of egress ports, wherein the releasing step occurs before the data packet is queued.

3. The method of claim 1, wherein releasing the first set of buffers comprises:
identifying the first set of buffers as available.

4. The method of claim 1, further comprising:
accessing a forwarding database to determine the subset of the second set of egress ports through which the data packet is to be forwarded.

5. The method of claim 4, wherein,
the determination that the data packet is not to be forwarded through the first set of egress ports comprises the accessing step.

6. The method of claim 1, wherein,
the second set of egress ports are not configured to receive data read from the first set of buffers; and
the first set of egress ports are not configured to receive data read from the second set of buffers.

7. The method of claim 1, further comprising:
reading the data packet from the second set of buffers, wherein the forwarding step comprises forwarding the data packet read from the second set of buffers.

8. The method of claim 1, wherein the data packet comprises payload encapsulated in a Media Access Control (MAC) frame.

9. The method of claim 1, wherein the network device comprises a selection from the group consisting of a router, a switch, a bridge, and any combination thereof.

10. A method of forwarding a data packet using different memory banks of a network device, the method comprising:
writing the data packet to a first set of buffers in a first memory bank before determining whether the data packet is to be forwarded through the first set of egress ports based on accessing at least one forwarding database, the first memory bank coupled with a first set of egress ports for the device;
writing the data packet to a second set of buffers in a second memory bank before determining whether the data packet is to be forwarded through the second set of egress ports based on accessing the at least one forwarding database, the second memory bank coupled with a second set of egress ports for the device;
determining whether the data packet is to be forwarded through the first set of egress ports or the second set of egress ports based on accessing the at least one forwarding database;
releasing the first set of buffers if it is determined that the data packet is to be forwarded through the second set of egress ports and not to be forwarded through the first set of egress ports;
queuing a descriptor of the data packet written to the second set of buffers after the first set of buffers is released, the descriptor identifying a port of the second set of egress ports through which the data packet is to be forwarded; and forwarding the data packet identified by the descriptor from the second set of buffers through the port identified in the second set of egress ports if it is determined that the data packet is to be forwarded through the second set of egress ports.

11. The method of claim 10, wherein the queuing step comprises:
queuing the descriptor in a transmit queue identifying the sequence that data packets are to be transmitted through the port.

12. The method of claim 10, further comprising:
receiving additional packets through a plurality of ingress ports; and
writing each additional packet received both to buffers in the first memory bank and to buffers in the second memory bank.

13. The method of claim 10, wherein the first memory bank and the second memory bank each comprise a plurality of memory modules.

14. The method of claim 10, wherein the first memory bank and the second memory bank comprise a selection from the group consisting of static Random Access Memory (RAM), dynamic RAM, flash memory, other media capable of storing data, and any combination thereof.

15. An apparatus for forwarding a data packet using different sets of buffers, the apparatus comprising:
a plurality of egress ports;
a first set of buffers coupled with a first subset of the plurality of egress ports;
a second set of buffers coupled with a second subset of the plurality of egress ports;
a receive unit configured to receive a data packet through an ingress port;
a memory access unit configured to:
write the data packet to the first set of buffers before a determination whether the data packet is to be forwarded through the first subset of the plurality of egress ports, the determination being based on accessing at least one forwarding database,
write the data packet to the second set of buffers before a determination whether the data packet is to be forwarded through a second subset of the plurality of egress ports, the determination being based on accessing the at least one forwarding database
determine whether to forward the data packet through the first subset of the plurality of egress ports or the second subset of the plurality of egress ports based on accessing the at least one forwarding database, and
release the data packet from the first set of buffers if it is determined that the data packet is to be forwarded through the second subset of the plurality of egress ports and not to be forwarded through the first subset of the plurality of egress ports;
a forwarding database configured to identify one or more ports through which a received packet is to be forwarded;
a forwarding database engine configured to access the forwarding database to determine whether the data packet is to be forwarded through the first set of egress ports; and
a transmit unit configured to forward the data packet from the second set of buffers through at least one port of the second subset of egress ports if it is determined that the data packet is to be forwarded through at least one port of the second subset of egress ports.

16. The apparatus of claim 15, further comprising:
a transmit queue unit coupled with the second set of buffers and with the at least one port of the second subset of egress ports, and configured to schedule the data packet for forwarding through the at least one port,
wherein the memory access unit is further configured to release the data packet from the first set of buffers before the data packet is scheduled in the transmit queue unit.

17. The apparatus of claim 15, wherein the memory access unit is configured to release the first set of buffers by identifying the first set of buffers as available.

18. The apparatus of claim 15,
wherein the forwarding database engine is configured to access the forwarding database to determine the at least one port of the second set of egress ports to which the data packet is to be forwarded.

19. The apparatus of claim 18, wherein the determination that the data packet is not to be forwarded through the first set of egress ports comprises the forwarding database engine determination of the at least one port of the second set of egress ports to which the data packet is to be forwarded.

20. The apparatus of claim 15, wherein,
the second set of egress ports are not configured to receive data read from the first set of buffers; and
the first set of egress ports are not configured to receive data read from the second set of buffers.

21. The apparatus of claim 15, wherein,
the memory access unit is further configured to read the data packet from the second set of buffers; and
the transmit unit forwards the data packet read from the second set of buffers.

22. The apparatus of claim 15, wherein the data packet comprises a payload encapsulated in a Media Access Control (MAC) frame.

23. The apparatus of claim 15, wherein the apparatus comprises a selection from the group consisting of a router, a switch, a bridge, and any combination thereof.

24. An apparatus for forwarding a data packet using different memory banks, the apparatus comprising:
a plurality of egress ports;
a first memory bank coupled with a first subset of the plurality of egress ports;
a second memory bank coupled with a second subset of the plurality of egress ports;
a receive unit configured to receive a data packet via an ingress port;
a memory access unit configured to:
write the data packet to a first set of buffers in the first memory bank before a determination is made from accessing at least one forwarding database whether the data packet is to be forwarded through the first subset of the plurality of egress ports,
write the data packet to a second set of buffers in the second memory bank before a determination is made from accessing the at least one forwarding database whether the data packet is to be forwarded through the second subset of the plurality of egress ports, and
release the first set of buffers in response to the determination made from accessing the at least one forwarding database that the data packet is to be forwarded through the second subset of the plurality of egress ports and not to be forwarded through the first set subset of the plurality of egress ports;
a transmit queue unit configured to queue a descriptor of the data packet written to the second set of buffers after the first set of buffers are released, the descriptor identifying a port of the second subset through which the data packet is to be forwarded if it is determined that the data packet is to be forwarded through the second subset of egress ports; and
a transmit unit configured to forward the data packet identified by the descriptor from the second set of buffers through the port of the second subset of egress ports if it is determined that the data packet is to be forwarded through the second subset of egress ports.

25. The apparatus of claim 24, wherein the transmit queue unit identifies the sequence that data packets are to be transmitted through the port.

26. The apparatus of claim 24, further comprising:
at least one additional ingress port, wherein,
the receive unit is further configured to receive an additional packet through the at least one additional ingress port; and
the memory access unit is further configured to write the additional packet received to both buffers in the first memory bank and buffers in the second memory bank.

27. The apparatus of claim 24, wherein,
the first memory bank and the second memory bank each comprise a plurality of memory modules.

28. The apparatus of claim 24, wherein the first memory bank and the second memory bank comprises a selection from the group consisting of static Random Access Memory (RAM), dynamic RAM, flash memory, other media capable of storing data, and any combination thereof.

* * * * *